Patented July 28, 1942

2,291,169

UNITED STATES PATENT OFFICE 2,291,169

NITROCELLULOSE PRODUCTION

Gilbert E. Moos, Cincinnati, Ohio, assignor to The American Oak Leather Company, Cincinnati, Ohio, a corporation of Ohio No Drawing. Application June 24, 1941,
Serial No. 399,529

5 Claims. (Cl. 260—220)

My invention relates to the use of hitherto waste material containing cellulose material for the production of nitrocellulose of high quality. There are practically limitless supplies of spent wood particles and tanbark, which have been treated for removal of tannin for use in the tanning of leathers, which as a waste material has little or no value. Since this material has simply been treated with water to remove the tannin, and since it contains the natural lignins and other materials insoluble in water of the wood and bark, when in spent condition, it has not been regarded as a suitable material as a source of cellulose for nitrating at least without a preliminary and expensive purification treatment.

It is my object to nitrate directly this spent tanbark or wood chips from which the tannin has been removed and which is a waste product, to produce a high value nitrocellulose. I have discovered that by a certain form of treatment I have been able to produce a resulting nitrocellulosic product, although without advance purification of the spent woody material or bark except the water extraction to remove tannins, and other soluble substances.

As a reagent I employ a combination of nitric and sulphuric acid, of commercial purity, for example 1.42 nitric and 1.84 sulphuric acid, and preferably in a one to one mixture. Figuring out the weights of anhydrous acid and water this means 54.7% of sulphuric acid, and 30.9% of nitric acid and 14.4% of water. Within the general range of these figures there will be roughly a one to one mixture of commercial acids readily obtainable. The concentrations in water I do not know to be of importance, the above example being simply the most available commercial products as used by me.

In the laboratory the precise amounts used and treatment followed is as follows in my preferred process, it being understood that this is given as an example within which there will be allowable variations. To three-tenths of a gram of spent tanbark add 10 milliliters of one to one nitric-sulphuric acid as above defined. Agitate the enclosed materials for one hour, and then stop the action by dilution with 50 milliliters of water.

Then the resultant product must be washed very thoroughly with water, after which it is dried at 105 degrees C. There results a very fast burning nitrocellulose product in spite of the fact that impurities in the wood or bark are still present to the extent that they themselves have not been acted upon or washed away during the process.

By increasing the proportions above given, it will be found that in commercial quantities it is simple to produce a high quality nitrocellulose product comparable to the nitrocellulose commercially available from cotton fibre cellulose. However, a raw material of little or no use, and an industrial waste product, is used for the process.

Where the reagent is modified as by reducing the amount of nitric acid in the mixture to a one to two or one to three mixture of the same commercial acids, the time of treatment must be extended. I have found that using the same proportions as in the above experiment, with a three to one reagent consisting of 77.2% sulphuric acid, 14.5% nitric acid and 8.3% water and agitating for five to twenty hours before adding the water dosage to stop the reaction I can obtain a commercial product of substantially the same characteristics.

More than one hundred experiments have been conducted, with a view to developing the maximum yield with greatest safety and with the minimum of work, however, the essence of my invention lies in the discovery that with concentrations of the nitric-sulphuric reagent, and time control of agitation balanced as the production chemist will know to do within the ranges of my two examples, a commercial nitrocellulose product can be produced from spent wood chips or bark after extracting the tannin and other soluble substances with water. I do not insist upon the accuracy of proportions given in the examples, which are illustrative rather than limitative of the scope of my invention, as I view it. The chemist knowing of my results will be able to balance the concentrations and proportions in the reagent, with time of treatment, to get a final product of proper characteristics, provided always that the product be very thoroughly washed before drying. The dilution of the mixture with water stops the reaction and has proven to be effective for laboratory purposes. As an alternative I may filter the acid through an acid resisting filter such as glass wool. This latter would be more economical because the acid would be undiluted and could be used again without concentration. The laboratory method may be regarded as a first step in the washing. What it does is render the reagent so weak that it does not continue to react. Too long a reaction will give poor results as will too short a reaction.

As certain water insoluble materials (lignin primarily) remain before nitration and either nitrate, dissolve, or subsequently burn completely, the product containing some nitrated material besides nitrocellulose is itself novel and within the scope of my invention.

Having thus described my invention, what I claim as new and desire to secure by Letters Patent is:

1. A process for making a nitrocellulose product which consists in using the proportions generally corresponding to three-tenths gram of spent wood chips or tanbark from which the tannin has been extracted by water extraction, and 10 milliliters of nitric-sulphuric acid mixture, being roughly in the proportions of 15 parts nitric to 75 parts sulphuric in a quantity of water substantially less than the weight of the anhydrous acids, agitating the material together for a period of at least five hours, stopping the reaction by dilution with a substantially large volume of water, and finally thoroughly washing the resultant product.

2. A process for making a nitrocellulose product which consists in using the proportions generally corresponding to three-tenths gram of spent wood chips or tanbark from which the tannin has been extracted by water extraction, and 10 milliliters of nitric-sulphuric acid mixture, being roughly in the proportions of 15 parts nitric to 75 parts sulphuric in a quantity of water substantially less than the weight of the anhydrous acids, agitating the material together for a period of at least five hours, stopping the reaction by dilution with a substantially large volume of water, thoroughly washing the resultant product and finally drying the same.

3. A process for making a nitrocellulose product which consists in using the proportions generally corresponding to three-tenths gram of spent wood chips or tanbark from which the tannin has been extracted by water extraction, and 10 milliliters of nitric-sulphuric acid mixture, being roughly in the proportions of 15 parts nitric to 75 parts sulphuric in a quantity of water substantially less than the weight of the anhydrous acids, agitating the material together for a period of at least five hours, stopping the reaction by dilution with a substantially large volume of water, thoroughly washing the resultant product and finally drying the same at slightly above 100 degrees C.

4. A process for producing nitrocellulose material which consists in agitating wood chips and tanbark, from which tannin has been removed by water extraction, with a mixture of nitric and sulphuric acids in the presence of some water for a length of time balanced as against the relative amounts and concentrations of the acids as to attain a free burning nitrocellulosic product, and then thoroughly washing the product, the concentration of nitric to sulphuric acid in the mixture being from substantially 15 percent of the acid content to 40 per cent thereof, and the time of agitation depending on the weaker content of nitric acid extending from about twenty hours to about one hour for the strongest nitric acid concentration in the mixture.

5. A process of producing nitrocellulose material, which consists in agitating wood chips and tanbark, from which tannin has been removed by water extraction, with a mixture of nitric and sulphuric acids in the presence of some water for a length of time balanced as against the relative amounts and concentrations of the acids as to attain a free burning nitrocellulosic product, then thoroughly washing the product, the concentrations of nitric-sulphuric acid being from around 15 per cent of nitric to 77 parts sulphuric, to around 30 per cent nitric to 54 per cent sulphuric.

GILBERT E. MOOS.